J. L. SELLERS.
ELEVATING TRUCK.
APPLICATION FILED JAN. 18, 1910.
985,212.
Patented Feb. 28, 1911.
2 SHEETS—SHEET 1.
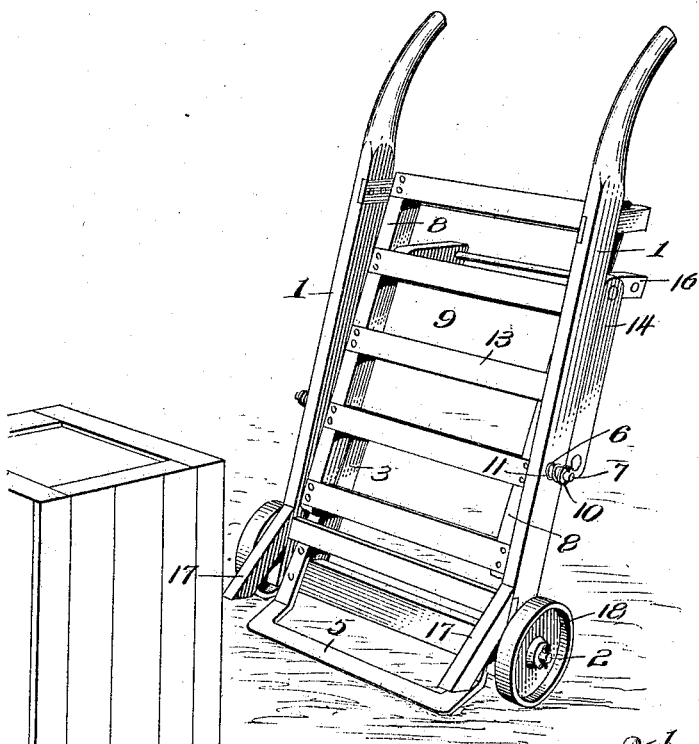
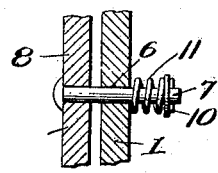
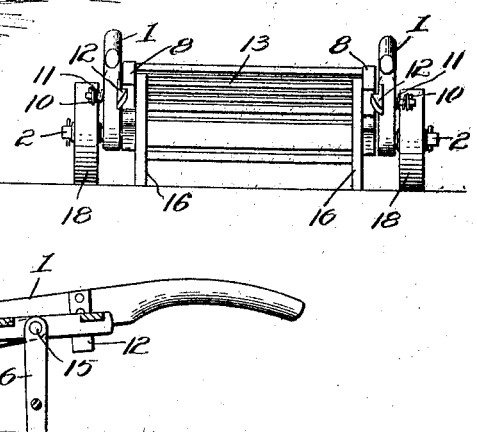
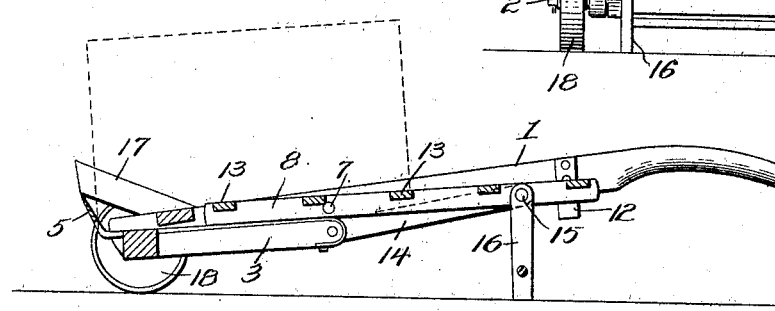
Inventor
Jacob L. Sellers.
Witnesses
By Victor J. Evans
Attorney J. L. SELLERS.
ELEVATING TRUCK.
APPLICATION FILED JAN. 18, 1910.
985,212.
Patented Feb. 28, 1911.
2 SHEETS—SHEET 2.
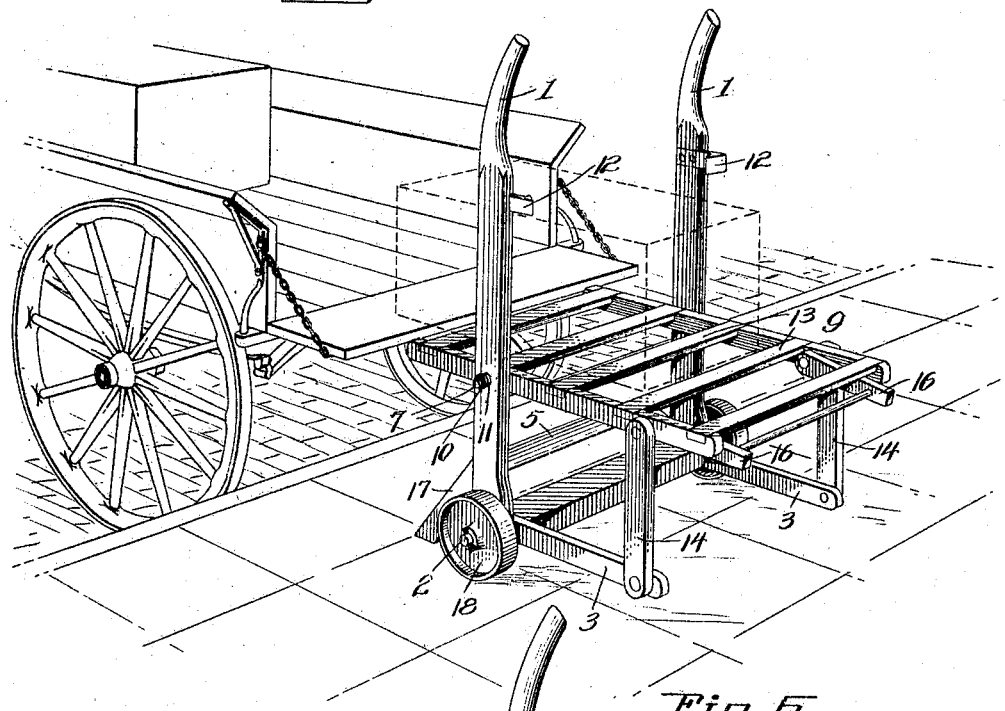
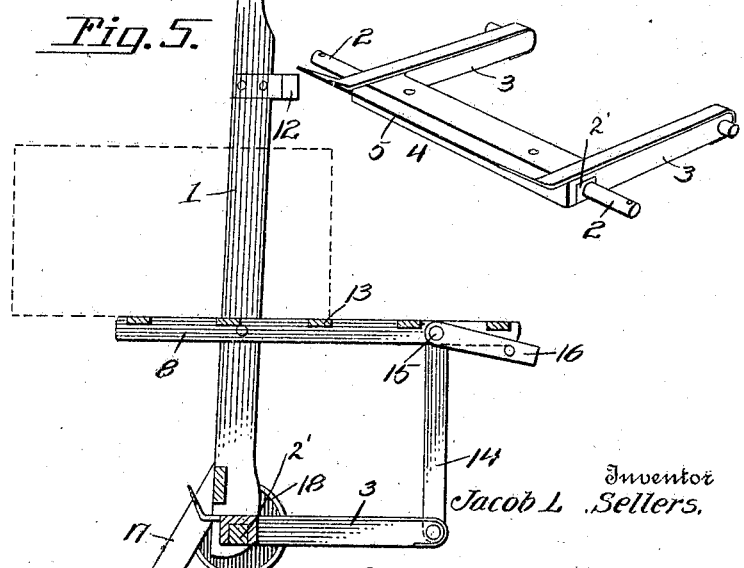
Inventor
Jacob L. Sellers.
By Victor J. Evans
Attorney
Witnesses
F. C. Gibson.

UNITED STATES PATENT OFFICE.

JACOB L. SELLERS, OF CHICOTA, TEXAS.

ELEVATING-TRUCK.

985,212.  Specification of Letters Patent.  Patented Feb. 28, 1911.

Application filed January 18, 1910. Serial No. 538,711.

*To all whom it may concern:*

Be it known that I, JACOB L. SELLERS, a citizen of the United States of America, residing at Chicota, in the county of Lamar and State of Texas, have invented new and useful Improvements in Elevating-Trucks, of which the following is a specification.

This invention relates to elevating trucks and has for an object to provide a movable platform which is controlled by movements of the truck so that the article handled by the truck can be elevated for the purpose of accurately and conveniently placing it on a wagon.

Another object of the invention resides in the peculiar construction of the platform which, during the transportation of the article handled will assume a plane approximately the same as the handles, means being employed for holding the platform in this position during the transportation of the article whereby it will readily sustain the weight of the article.

In the drawings forming a portion of this specification and in which like numerals of reference indicate similar parts in the several views, Figure 1 is a perspective view of my improved truck. Fig. 2 is a detail longitudinal section through the same. Fig. 3 is an end view of the truck. Fig. 4 is a detail perspective view showing the platform of the truck in its elevated position. Fig. 5 is a detail vertical section therethrough. Fig. 6 is a detail perspective view of the shoe. Fig. 7 is a detail section through one of the pivots which connects the platform with the handles.

My improved truck consists of identically formed spaced handled members 1 whose forward ends are perforated for the reception of the pintles 2 at the ends of the axle 2'. The axle is secured to the shoe 4. This shoe is provided with an angularly disposed head portion 5 which is adapted to be inserted beneath the article during the operation of placing the same on the truck and to facilitate the handling of the article as will be understood.

The handle members are provided with opposing passages 6 which receive the pintles 7 upon the side bars 8 of an elevating platform 9. The outer extremities of the pintles 7 are provided with stop pins 10 and confined between said pins and the outer surfaces of the handle members 1 are springs 11. This construction serves to provide for limited lateral movements of the handle members toward or away from each other.

The handle members are provided with latches 12 which are adapted to be engaged with the side members of the platform to hold the latter against pivotal movement. The springs 11 previously referred to serve to hold the latches normally engaged with the said members as is obvious.

It will of course be understood that the platform may be of any suitable well known construction, but as shown I preferably form it of an open-work structure, the said structure being formed by connecting the side members 8 by spaced slats or bars 13. The side members of the platform are connected with the members 3 of the shoe by means of pivoted links 14. The pivot pins 15 which connect the links 14 with the side members of the truck are provided with combined stops and supporting legs 16 which, as shown in Fig. 2 of the drawings, are adapted to engage the floor or surface of the ground to hold the handle members sufficiently spaced therefrom to enable the operator to conveniently grasp them.

The forward ends of the handle members are provided with supports 17 which are adapted to be engaged with the surface of the ground to limit the pivotal movement of the handle members forwardly past a predetermined point.

In operation of the herein described truck, the article to be transported is first placed on the platform as shown in dotted lines in Fig. 2 of the drawing. After the article has been operatively positioned on the platform the truck may be moved to the wagon shown in Fig. 4 of the drawings or to any other point where the article on the truck is to be deposited and by exerting an outward pressure on each handle the platform will be released and by moving the handles forwardly and upwardly the platform will be elevated and moved to assume a position in spaced relation to the surface of the ground. In this position of the platform the article which is being handled may be conveniently moved from the platform and onto the bed of the wagon. The pintles 2 of the shoe are provided with supporting wheels 18 of any suitable well known construction.

The construction of the truck herein disclosed is extremely simple and in practice will facilitate handling heavy articles such as stoves, dry goods boxes, barrels or the like, and its use will obviate having to lift the articles onto the wagon to be loaded.

I claim:—

1. An elevating truck comprising a pair of relatively movable handles, a movable platform operatively connected with the handles, an axle, a shoe fixed to the axle, connections between the said shoe and the platform, retaining means carried by the handles and operable to engage the platform to hold the same rigid between the handles and approximately in a plane therewith, and means engaging the handles to hold the retaining means thereof operatively associated with the platform.

2. An elevating truck comprising a platform, a shoe, relatively movable handles at the sides of the platform, the said handles being formed to provide bearings for pivotally supporting the said shoe, connections between the shoe and the said platform, and means operable to hold the platform against movement and positioned immediately between the said handles.

3. An elevating truck comprising relatively movable handles, a pivoted platform carried by the handles, a pivoted shoe having portions mounted in the handles, spaced side members carried by the shoe, pivoted links operatively connecting the said side members of the shoe with the platform, retaining means supported by the handles and operable to engage the platform to support the same in a plane with the handles, and spring means bearing against the handles to hold the retaining means engaged with the platform to hold the latter against pivotal movement.

4. An elevating truck comprising movably connected spaced handles, a pivotally mounted platform located between and supported by the handles, retaining means carried by the handles, spring means exerting its tension against the handles to hold the retaining means engaged with the platform, a pivoted shoe connected with the handles, and supporting means connecting the shoe with the platform and operable to hold the platform at right angles to the handles when the platform-engaging means of the handles are released from the platform.

5. An elevating truck comprising relatively movable handles, a platform pivotally connected with the handles, retaining means on the handles for engaging the platform to hold the same against movement, means engaging the handles to normally hold the retaining means thereon engaged with the platform, and supporting means for holding the platform in a horizontal position and at right angles to the handles when the said platform-engaging means on the handles are disengaged from the platform.

In testimony whereof I affix my signature in presence of two witnesses.

JACOB L. SELLERS.

Witnesses:
W. M. WESTBROOK,
J. M. CAMPBELL.